(12) United States Patent
Weber et al.

(10) Patent No.: US 9,644,704 B2
(45) Date of Patent: May 9, 2017

(54) VIBRATION SAFE MOTOR FIXATION IN AN ACTUATOR

(71) Applicant: Johnson Electric S.A., Murten (CH)

(72) Inventors: Rolf Weber, Oberscherli (CH); Michael Watzek, Courgevaux (CH); Bruno Neuhaus, Wallenried (CH); Yvan Bourqui, Corminboeuf (CH)

(73) Assignee: Johnson Electric S.A., Murten (CH)

( * ) Notice: Subject to any disclaimer, the term of this patent is extended or adjusted under 35 U.S.C. 154(b) by 589 days.

(21) Appl. No.: 14/166,762

(22) Filed: Jan. 28, 2014

(65) Prior Publication Data
US 2014/0209781 A1 Jul. 31, 2014

(30) Foreign Application Priority Data
Jan. 29, 2013 (GB) .................................. 1301561.5

(51) Int. Cl.
| | |
|---|---|
| *H02K 5/24* | (2006.01) |
| *F16F 15/06* | (2006.01) |
| *H02K 7/116* | (2006.01) |
| *F16H 57/02* | (2012.01) |

(52) U.S. Cl.
CPC .............. *F16F 15/06* (2013.01); *H02K 5/24* (2013.01); *H02K 7/1166* (2013.01); *F16H 2057/02034* (2013.01)

(58) Field of Classification Search
CPC  H02K 5/00; H02K 5/22; H02K 5/225; H02K 5/24; F16H 2057/02034
USPC ................................. 74/421 A, 425; 310/89
See application file for complete search history.

(56) References Cited

U.S. PATENT DOCUMENTS

| | | | | |
|---|---|---|---|---|
| 2,466,267 | A * | 4/1949 | Canio .................... | H02K 23/40 310/257 |
| 4,171,190 | A * | 10/1979 | Hudson .................... | H02K 5/24 248/638 |
| 5,937,507 | A * | 8/1999 | Asakura .................. | H02K 5/225 29/596 |
| 5,952,745 | A * | 9/1999 | Yasuda .................... | G08B 6/00 310/40 MM |
| 5,986,367 | A * | 11/1999 | Tsuzaki .................... | H02K 5/00 310/40 MM |
| 6,406,514 | B1 * | 6/2002 | Vystrcil .................... | A47L 5/30 15/412 |
| 6,783,423 | B2 * | 8/2004 | Kaneko .................. | A63H 17/26 446/269 |

(Continued)

FOREIGN PATENT DOCUMENTS

| | | |
|---|---|---|
| EP | 0 696 833 A1 | 2/1996 |
| JP | 2531124 * | 4/1997 |

(Continued)

*Primary Examiner* — William C Joyce
(74) *Attorney, Agent, or Firm* — Muncy, Geissler, Olds & Lowe, P.C.

(57) ABSTRACT

An actuator (10) has a casing (12) and an output (16). An electric motor (20) is disposed in a compartment (18) of the casing (12). The output (16) is driven by the motor (20) through a gear train disposed within the casing (12). The gear train includes a worm (30) on a shaft (22) of the motor (20) and a worm wheel (32) meshed with the worm (30). A mounting clip (40) is arranged to resiliently press the motor (20) into the compartment 18). The mounting clip (40) has fingers (44) which engage axial ends of the motor (20) to support the motor (20) against axial movement and separation due to axial loading and/or external vibrations acting on the actuator (10).

15 Claims, 3 Drawing Sheets

(56) References Cited

U.S. PATENT DOCUMENTS

| | | | | |
|---|---|---|---|---|
| 6,904,608 B2* | 6/2005 | Jeong | G11B 33/12 | 369/263.1 |
| 7,084,535 B2* | 8/2006 | Holman, IV | H02K 7/061 | 310/81 |
| 7,192,066 B2* | 3/2007 | Ilea | E05B 81/25 | 292/201 |
| 7,679,240 B2* | 3/2010 | Kono | H02K 5/00 | 310/81 |
| 7,709,983 B2* | 5/2010 | Umehara | H02K 5/00 | 310/81 |
| 8,421,289 B2* | 4/2013 | Hara | H02K 5/04 | 310/81 |
| 2002/0184760 A1* | 12/2002 | Babin | H02K 5/00 | 29/888 |
| 2006/0053921 A1* | 3/2006 | Kawamura | B60R 25/02153 | 74/425 |
| 2006/0181161 A1* | 8/2006 | Kawamoto | H02K 7/1166 | 310/51 |
| 2009/0107274 A1* | 4/2009 | Fukushima | B60R 1/074 | 74/426 |
| 2009/0218896 A1* | 9/2009 | Uchiumi | H02K 5/00 | 310/81 |
| 2010/0001604 A1* | 1/2010 | Hayakawa | B60H 1/00857 | 310/91 |
| 2014/0373664 A1* | 12/2014 | Takano | B60R 25/0215 | 74/495 |
| 2015/0075311 A1* | 3/2015 | Kanzaki | F16H 57/02 | 74/421 A |

FOREIGN PATENT DOCUMENTS

| | | | |
|---|---|---|---|
| JP | 10-85668 | * | 4/1998 |
| JP | 2004-290706 | * | 10/2004 |
| JP | 2009-159668 A | | 7/2009 |

* cited by examiner

VIBRATION SAFE MOTOR FIXATION IN AN ACTUATOR

CROSS REFERENCE TO RELATED APPLICATION(S)

This application claims the benefit of British patent application serial no. GB1301561.5, filed on Jan. 29, 2013. The entire content of the aforementioned patent application is hereby incorporated by reference for all purposes.

FIELD OF THE INVENTION

This invention relates to an actuator incorporating an electric motor and in particular, to an actuator where the electric motor is supported against vibration.

BACKGROUND OF THE INVENTION

In heavy duty applications such as those experienced in automotive applications, especially on or near the engine, vibration and internal loads can be very significant to such an extent that there is high risk of destruction or damage of individual components of an actuator. DC electric motors used in these actuators are typically built with a deep drawn or cup shaped metal housing having an open end closed by a plastic end cap containing brush holders, motor terminals and a bearing which holds and guides the rotor.

Under heavy loading (for the size of the actuator) and under high vibration, the connection between the end cap and the housing is placed under great stress which can lead to the end cap becoming separated from the housing in an extreme situation or simply becoming loose which affects the operation of the motor, increasing audible noise and generally reducing the performance of the motor and thus of the actuator.

Prior art attempts to reduce the effects of vibration on the motor tend to concentrate on stopping vibration from the motor being transmitted to the body or casing of the actuator. For example, U.S. Pat. No. 5,696,360 describes a motor mount used in a vehicle, having an elastic sound-absorbing material used to prevent transmission of vibrations from the motor to the body of the vehicle. This vibration absorbing motor mount must allow the motor to move with respect to the housing to be able to absorb the vibrations. This means that the alignment and spacing between the motor shaft and the gear train is not constant. This is undesirable in a gear train where distances between wheel, worm and any other shaft axes must be kept constant.

Hence there is a desire for a motor mount which supports the motor against vibration, whether the source of the vibration is external or internal of the motor.

SUMMARY OF THE INVENTION

This is achieved in the present invention by using a vibration safe method for fixing the motor to a supporting structure, especially a casing of an actuator of which the motor is a part.

Accordingly, in one aspect thereof, the present invention provides an actuator comprising: a casing having a compartment formed therein; an electric motor disposed in the compartment of the casing; a gear train disposed within the casing and driven by the motor; and a mounting clip resiliently pressing the motor into the compartment and having a plurality of fingers engaging axial ends of the motor to support the motor against axial movement.

Preferably, the gear train comprises a worm formed on a shaft of the motor and a worm gear in mesh with the worm to provide a speed reduction of the motor shaft.

Preferably, the motor has a housing with a closed end and an open end and an end cap attached to the open end; and the mounting clip has a body portion radially pressing the housing of the motor and a plurality of connecting portions extending from the body portion and connected with the casing.

Preferably, the mounting clip has a plurality of fingers extending radially inward from axial ends of the body portion and resiliently engaging axial ends of the motor to urge the end cap and housing together.

Preferably, the body portion of the mounting clip extends from the closed end of to the open end of the housing of the motor and has a number of axially extending corrugations allowing the mounting clip to be resiliently stretched circumferentially around the housing of the motor to urge the motor into the compartment of the casing.

Preferably, the body portion of the mounting clip is axially un-extendable.

Preferably, the body portion of the mounting clip comprises: a plurality of axially extending beams, wherein the plurality of fingers extend from the plurality of axially extending beams; and a plurality of resiliently deformable curved struts extending axially, each connecting two adjacent beams of the plurality of axially extending beams.

Preferably, the mounting clip grips the housing of the motor and extends over the end cap of the motor to hold the end cap to the housing.

Preferably, the mounting clip is a metallic clip and the casing is made of plastic.

Preferably, the mounting clip is made of spring steel.

Preferably, the actuator further comprises a plurality of screws connecting the plurality of connecting portions of the mounting clip to the casing.

Preferably, the mounting clip is fixed to the casing by a press-in connection.

Preferably, the casing has a plurality of holes formed adjacent the compartment; and the mounting clip has a plurality of barbed projections pressed into the plurality of holes in the casing.

Preferably, the actuator further comprises a positioning plate fixed to the casing to support the motor against radial forces acting on the motor from the gear train.

Preferably, the positioning plate is arranged to axially position the motor within the compartment of the housing.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
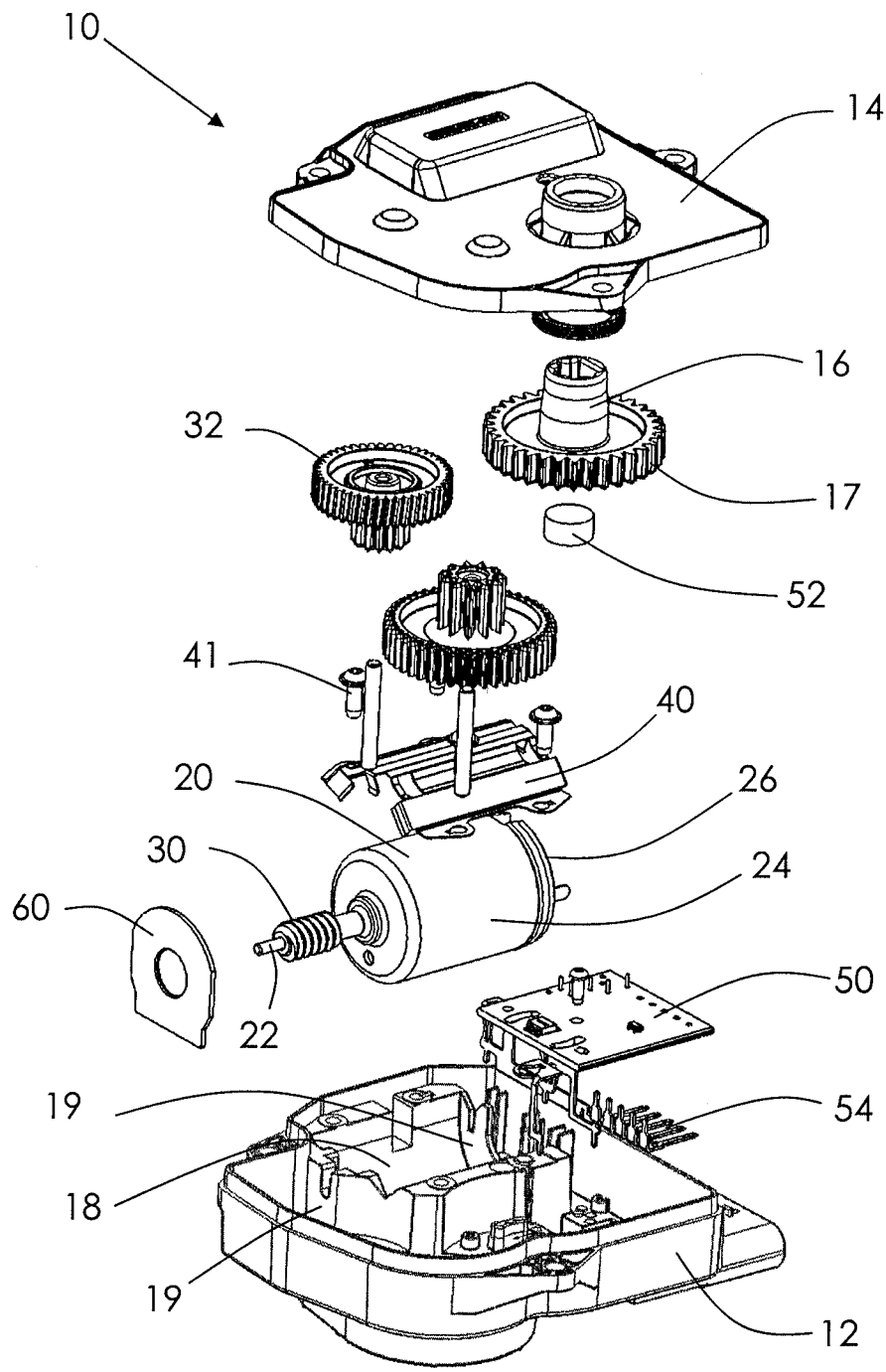
FIG. 1 is an exploded view of an actuator according to the preferred embodiment of the present invention.

FIG. 1 illustrates an actuator 10 according to a preferred embodiment of the present invention. The actuator 10 is part of a water valve of a thermal management system for an internal combustion engine of an automobile, especially a passenger vehicle. The actuator 10 is used to move a valve member between a closed position in which the valve is closed and an open position in which the valve is fully open. Ideally, the valve member may be positioned at locations between the closed and fully open positions to restrict the flow of working liquid through the valve.

The actuator 10 has a casing comprising a body 12 and a cover 14. The casing 12 accommodates an electric motor 20, typically a small sized DC motor in the miniature or micromotor range. The motor 20 drives an output 16 via a gear train. The gear train includes a worm 30 fitted to or formed on a shaft 22 of the motor 20 and a worm wheel 32 in mesh with the worm 30 as part of a speed reduction gear arrangement to reduce the speed and thus to increase the torque of the output of the actuator 10. The output 16 may be an output shaft or, as shown in this embodiment, a gear wheel 17 having a socket into which a spindle of the water valve is disposed.

Figure 2:
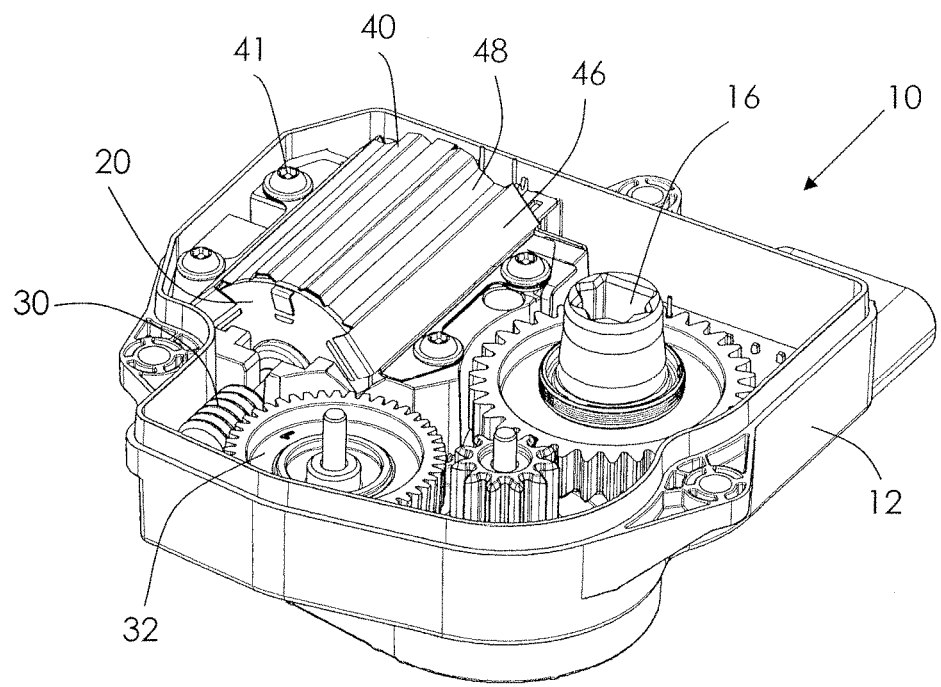
FIG. 2 is an assembled view of the actuator of FIG. 1, with the cover removed.

FIG. 2 illustrates the assembly actuator 10 with the cover 14 omitted to show the assembled arrangement within the casing 12.

The motor 20 has a deep drawn metal housing 24 with an open end which is closed by a plastic end cap 26 fixed by crimping the open end of the housing 24. The end cap 26 supports motor terminals and a bearing supporting the motor shaft 22. A second bearing supporting the motor shaft 22 is mounted to the closed end of the housing 24. Preferably the bearings are oil impregnated sintered bushings which allow the shaft 22 to move axially through the bushings. The shaft 22 has collars or spacers arranged to limit the axial movement of the shaft 22 through the bushings. This limited movement is known as the axial play of the shaft. Preferably, the motor 20 is a brush type PMDC motor having permanent magnets fixed to an inner surface of the housing 24, brushes supported by the end cap 26 and a wound rotor core and commutator fixed to the shaft 22.

As mentioned above, the reaction between the worm 30 and the worm wheel 32 creates significant axial and radial forces on the motor shaft 22. Depending on the direction of rotation, the axial force results in the spacers on the shaft 22 pressing against the bearings in an axially outward direction, which means that the axial loading is trying to push the end cap 26 away from the housing 24, thereby putting great strain on the crimps holding the end cap 26 to the housing 24. Under heavy vibration and repeated severe axial loading, such as when the valve reached the end of travel, the small metal crimps get dragged through the relatively soft material of the plastic end cap 26 resulting in the end cap 26 becoming loose and possibly disconnecting from the housing 24.

The actuator casing 12 defines a compartment 18 for the motor 20. The compartment 18 has mounting struts (not shown) on which the motor 20 sits and end walls 19 which correspond to the axial ends of the motor 20. However, due to manufacturing tolerances, both on the components of the motor 20 and the casing 12 itself, and to allow easy assembly, there is a certain gap between the end walls 19 and the axial ends of the motor 20. Also although axial thrust surfaces may be provided on the casing 24 to support the shaft 22 against axial loading, there must be some axial play to allow the rotor to rotate freely. Besides, being plastic, the casing 12 has a high degree of flexibility and thus the axial thrust surfaces do allow the spacers to contact the bearings under high vibration and heavy axial loading.

Figure 3:
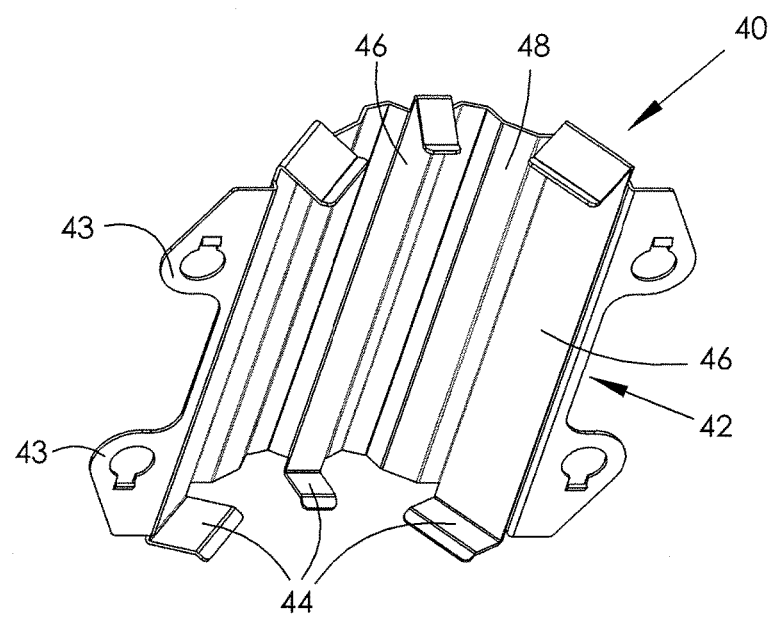
FIG. 3 is an isometric view of a motor mounting clip, being a part of the actuator of FIG. 1.

The motor 20 is fixed in the compartment 18 by a mounting clip 40. The mounting clip 40 is shown more clearly in FIG. 3. The mounting clip 40 engages the radially outer surface of the housing 24 of the motor 20 and is resiliently deformed around the housing 24 as it is fixed to the casing 12. In this embodiment the clip 40 is fixed to the casing 12 by four screws 41, the clip 40 being deformed as the screws 41 are tightened. Ideally, the clip 40 has a body portion 42 which engages the housing 24. Lugs 43 with holes therein extend from the body portion 42. The screws 41 pass through the holes in the lugs 43 to fix the mounting clip 40. The body portion 42 is wavy in the circumferential direction or has a number of corrugations extending axially to allow the body portion 42 to be resiliently deformed or stretched in the circumferential direction. In an embodiment, the mounting clip is made of spring steel. Preferably the clip 40 presses the motor 20 to the casing 12 with a force of typically 200N. Due to the resilient nature of the clip 40, tight fixation of the motor 20 to the casing 12 is achieved regardless of normal dimensional tolerances.

The body portion 42 is rigid or at least non-extendable in the axial direction. Fingers 44 extend from the axial ends of the body portion 42 and resiliently press against the axial ends of the motor 20, i.e. against the end cap 26 and the closed end of the housing 24, pressing the end cap 26 to the housing 24. Preferably, the fingers 44 press against the end cap 26 with a total force of about 250N. The individual force applied by the fingers 44 may be different, for example, the middle finger may apply a force of 100N and two outer fingers may each apply a force of about 75N.

In the preferred mounting clip 40, the body portion 42 has a plurality of beams 46 extending axially along the motor housing 24 from one end of the motor 20 to the other. Adjacent beams are joined by curved struts 48 forming the corrugations in the body portion 42. The curved struts 48 are resiliently straightened as the body portion 42 is stretched over the housing 24, creating the pressing force which holds the motor 20 to the casing 12. The fingers 44 extend from the ends of the beams 46.

The actuator 10 further includes a circuit board 50 containing electronics for controlling the motor 20 and connectors 54 for connecting the actuator 10 to power and signal wires and the motor terminals to the circuit board 50. A sensor magnet is fitted to the shaft of the output wheel 17 to provide position feedback to the control circuit.

Optionally, a positioning plate 60 may be used to improve the alignment of the motor 20 within the motor compartment 18 of the casing 12. The positioning plate 60 is disposed on the end of the motor 20 adjacent the worm 30. In the embodiment shown, this is the closed end of the housing 24. Fingers 44 of the mounting clip 40 press the positioning plate 60 against the end of the motor 20. This gives better support and distribution of the lateral forces at the motor output side between the clip 40 and the housing 12, created in part by the radial forces generated between the worm 30 and the worm wheel 32. An edge portion of the positioning plate 60 is disposed in a slot formed in the casing 12. The positioning plate 60 supports the motor 20 against the radial forces applied to the shaft 22 from the worm wheel 32, which tend to move the shaft 22 and the motor 20 sideways.

Preferably, the positioning plate 60 is a tight fit or a press fit into the slot and gives a reliable datum to the axial positioning of the motor 20 within the casing 12 which is not adversely affected by the dimensional tolerances of the motor 20 itself, especially the housing 24 and the end cap 26.

Figure 4:
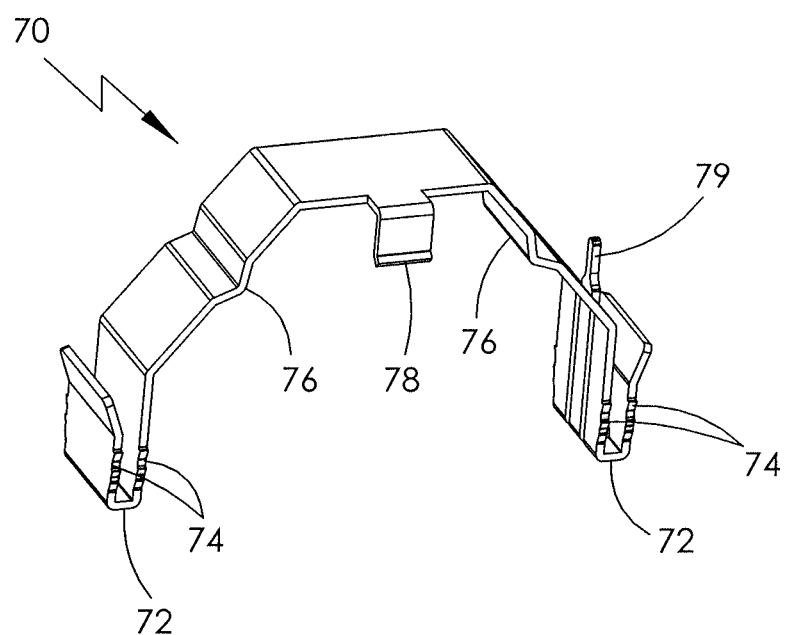
FIG. 4 is an isometric view of a motor mounting clip according to second embodiment of the present invention.

FIG. 4 shows an alternative clip 70. The clip 70 is essentially U-shaped to straddle the housing 24 of the motor 20 with the ends of the legs formed with sprung insertion ends 72 having barbed edges 74. The legs also have a lateral deformation forming an inside ridge 76 running axially. A finger 78 extends inwardly from an axial end of the base of the U. In use, the clip 70 is straddled over the motor 20 with the finger 78 pressing against the end cap 26 and the ridges 76 pressing against the radially outer surface of the housing 24. The ends 72 of the legs are pressed into respective holes in the casing 12. The holes are dimensioned to receive the ends 72 of the legs with the barbs biting into the end walls of the holes to resist removal. The clip 70 is resiliently deformed or stretched about the housing 24 as the legs are pressed into the holes in the casing 12. Preferably, the motor 20 is held by two such clips 70, one at each axial end of the motor 20. In this case, it is preferred that the positioning plate 60 is also used. A tab 79 provides for an earth connection.

The present invention provides an actuator in which it is simple to assemble the motor in a manner which supports the motor and in particular the end cap against high vibrations and heavy axial loading. At the same time being able to tightly fix the motor in a manner accepting normal dimensional tolerances.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. An actuator, comprising:
   a casing having a compartment formed therein;
   an electric motor disposed in the compartment of the casing;
   a gear train disposed within the casing and driven by the motor; and
   a mounting clip resiliently pressing the motor into the compartment and having a plurality of fingers engaging axial ends of the motor to support the motor against axial movement,
   wherein the mounting clip has a body portion radially pressing the motor, and the body portion has a plurality of beams extending axially and a plurality of resiliently deformable curved struts each of which is configured to connect adjacent beams, and wherein each finger is aligned to a corresponding beam in an axial direction of the motor.

2. An actuator according to claim 1, wherein the gear train comprises a worm formed on a shaft of the motor and a worm gear in mesh with the worm to provide a speed reduction of the motor shaft.

3. An actuator according to claim 1, wherein:
   the motor has a housing with a closed end and an open end and a end cap attached to the open end; and
   the body portion radially pressing the housing of the motor and a plurality of connecting portions extending from the body portion and connected with the casing.

4. An actuator according to claim 3, wherein the mounting clip has a plurality of fingers extending radially inward from axial ends of the body portion and resiliently engaging axial ends of the motor to urge the end cap and housing together.

5. An actuator according to claim 4, wherein the body portion of the mounting clip is axially un-extendable.

6. An actuator according to claim 3, wherein the mounting clip grips the housing of the motor and extends over the end cap of the motor to hold the end cap to the housing.

7. An actuator according to claim 3, further comprising a plurality of screws connecting the plurality of connecting portions of the mounting clip to the casing.

8. An actuator according to claim 1, wherein the mounting clip is a metallic clip and the casing is made of plastic.

9. An actuator according to claim 8, wherein the mounting clip is made of spring steel.

10. An actuator according to claim 1, wherein the mounting clip is fixed to the casing by a press-in connection.

11. An actuator according to claim 10, wherein:
    the casing has a plurality of holes formed adjacent the compartment; and
    the mounting clip has a plurality of barbed projections pressed into the plurality of holes in the casing.

12. An actuator according to claim 1, further comprising a positioning plate fixed to the casing to support the motor against radial forces acting on the motor from the gear train.

13. An actuator according to claim 12, wherein the positioning plate is arranged to axially position the motor within the compartment of the housing.

14. An actuator, comprising:
    a casing having a compartment formed therein;
    an electric motor disposed in the compartment of the casing;
    a gear train disposed within the casing and driven by the motor; and
    a mounting clip resiliently pressing the motor into the compartment and having a body portion radially pressing the motor and a plurality of connecting portions extending from the body portion and connected with the casing,
    wherein the body portion has a plurality of flat beams and a plurality of resiliently deformable curved struts each of which is configured to connect adjacent beams, and
    wherein the mounting clip further has a finger extending radially and inwardly from an axial end of a corresponding beam.

15. An actuator according to claim 14, wherein the mounting clip having a plurality of fingers engaging axial ends of the motor to support the motor against axial movement.

* * * * *